R. J. P. GOODWIN.

Construction of Strainers.

No. 6,248. Reissued Jan. 26, 1875.

WITNESSES.

E. H. Johnson

J. P. Crawford

Edward P. Woods
Daniel Sherwood
Cyrus K. Latham
PER E. A. Burgin
Atty

UNITED STATES PATENT OFFICE.

RICHARD J. P. GOODWIN, OF MANCHESTER, NEW HAMPSHIRE, ASSIGNOR TO E. P. WOODS, DANIEL SHERWOOD, AND CYRUS H. LATHAM, OF LOWELL, MASSACHUSETTS.

IMPROVEMENT IN THE CONSTRUCTION OF STRAINERS.

Specification forming part of Letters Patent No. 63,879, dated April 16, 1867; reissue No. 6,248, dated January 26, 1875; application filed November 28, 1873.

*To all whom it may concern:*

Be it known that RICHARD J. P. GOODWIN, of Manchester, in the county of Hillsborough and State of New Hampshire, did invent a new and Improved Strainer, of which the following is a specification:

The invention consists in making a strainer for liquids from wire-cloth, with a flange turned nearly at right angles with the body of the strainer on the wire-cloth, and in clamping said flange between two annular metal plates by means of a hem on one of the plates encompassing the edge of the other plate, which is grasped and held by the hem, while the flange formed on the wire-cloth is secured and held between the two plates, which construction enables the use of solder in the manufacture of wire-cloth strainers to be dispensed with.

Figure 1:
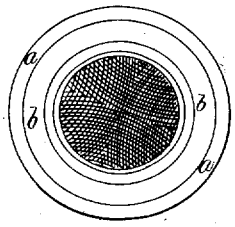
Figure 2:
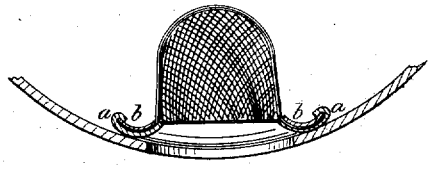
Figure 3:
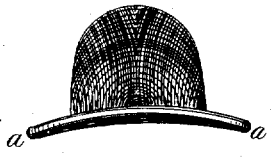

In the drawings, Figure 1 is a plan or top view of the strainer; Fig. 2, a vertical section, and Fig. 3 a side view, of same.

A represents the strainer, formed from wire-cloth in hemispherical shape between dies, with a flange projecting concentrically, and nearly at right angles with the body. *a* and *b* are two annular plates, one placed on one side of the wire-cloth flange, and the other on the opposite side. Plate *a* is larger in diameter than plate *b* or the flange of wire-cloth, and at its outer edge a hem is turned over to grasp the edge of plate *b*, and when the hem of plate *a* is closed down upon plate *b* it clamps the flange of the wire-cloth between the plates *a* and *b*, rendering the use of solder unnecessary, this construction being reliable, making the strainer stiff and strong, and preserving its integrity under exposure to dry heat.

The strainer may be secured by its flange in any vessel by slipping its flange under suitable ledges, fastened around the outlet on the inner side of a vessel, and in so doing the strainer can be removed to be cleaned or dried when needed.

What is claimed is—

1. The wire-cloth strainer A, the rim of which is at, or nearly at, right angles with the sides of the body, and secured between annular plates *a* and *b* by a hem on plate *a*, substantially as described.

2. In a strainer for liquids, the annular plate *a*, constructed in the manner and for the purpose described.

EDWARD PAYSON WOODS.
DANIEL SHERWOOD.
CYRUS H. LATHAM.

Witnesses:
W. B. COTTON,
HORACE F. SLOCUM.